June 6, 1939.  T. A. McGREGOR  2,161,366
ADJUSTABLE SUPPORT
Filed April 30, 1936  2 Sheets-Sheet 1
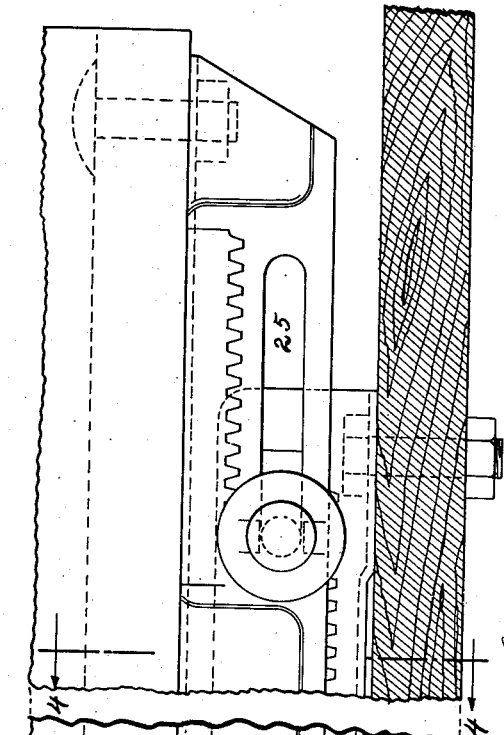
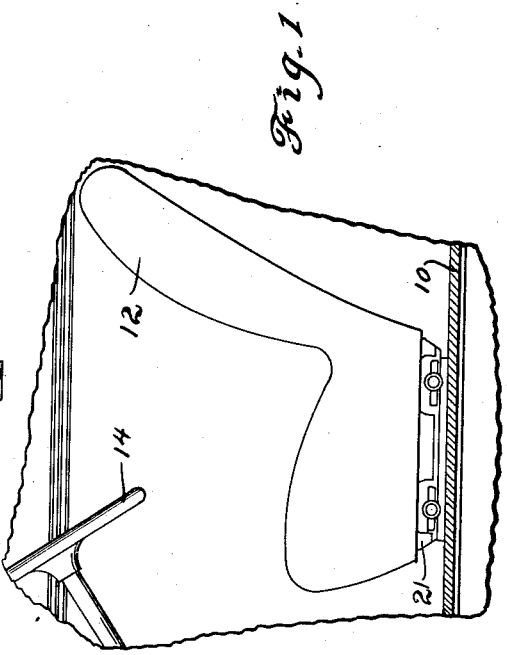
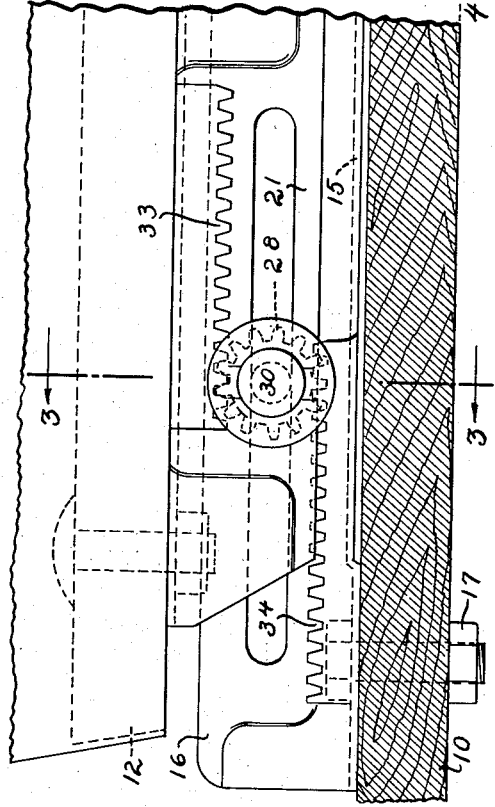
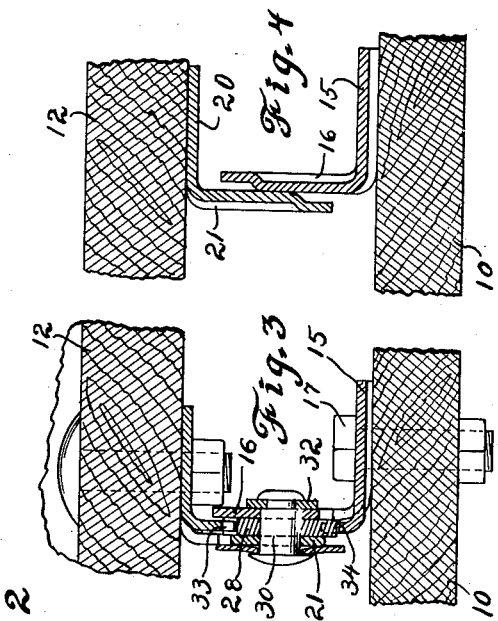
INVENTOR.
Thomas A. McGregor
BY
ATTORNEYS.

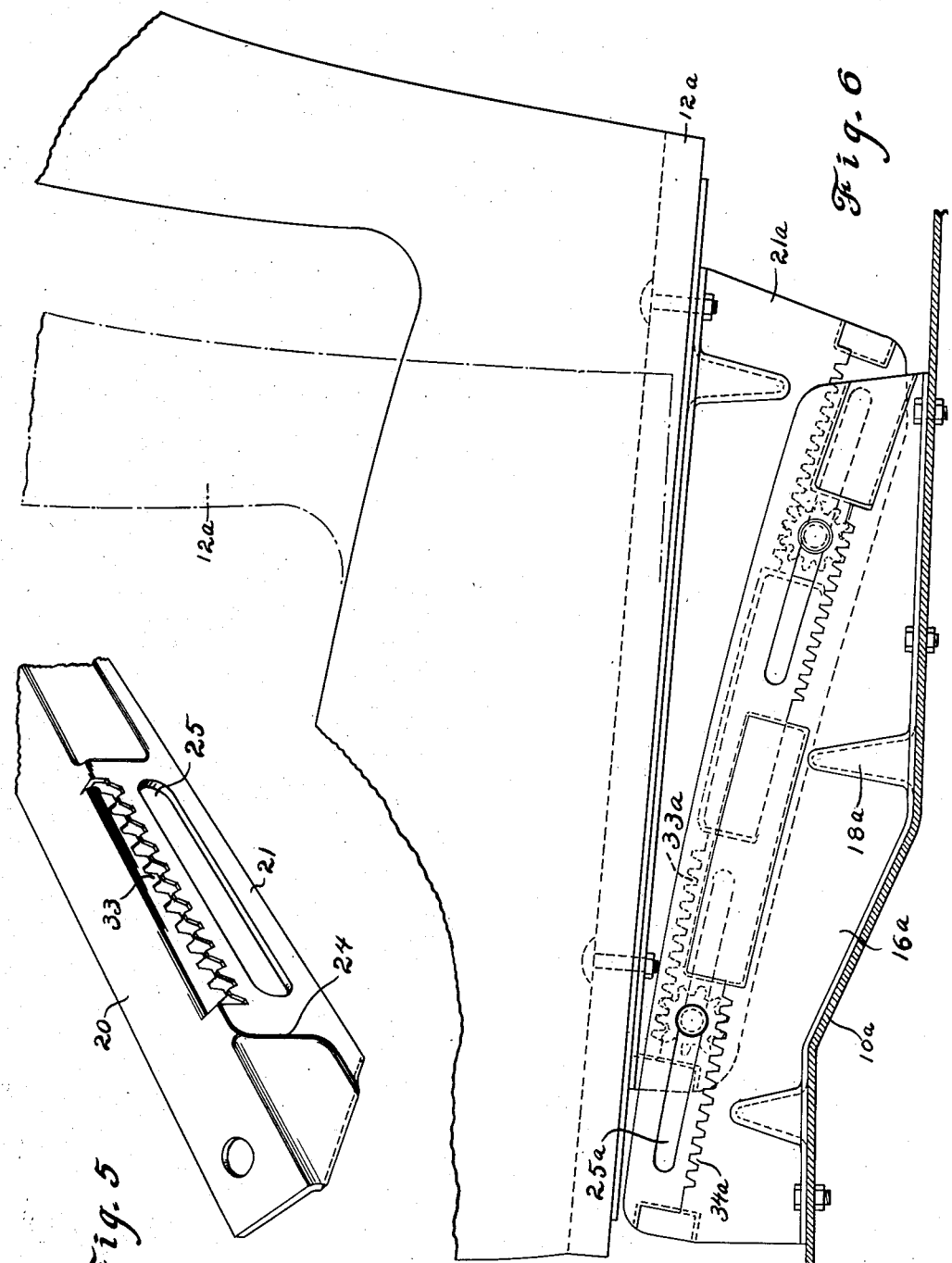

Patented June 6, 1939

2,161,366

UNITED STATES PATENT OFFICE 2,161,366

ADJUSTABLE SUPPORT

Thomas A. McGregor, Pontiac, Mich., assignor to American Forging & Socket Company, Pontiac, Mich., a corporation of Michigan Application April 30, 1936, Serial No. 77,272

8 Claims. (Cl. 155—14)

This invention relates to adjustable supports. Although the principles disclosed will be seen to be readily adaptable to other uses, the mechanism is particularly applicable to the provision of adjustable supporting means for motor vehicle seats, and aims to furnish a simple but sturdy construction for this purpose, which holds the seat rigidly against undesired side-play or turning but allows the occupant to very easily slide it longitudinally without rising.

An important object of the invention is the provision of such an adjustable support incorporating a minimum of metal and requiring a minimum of labor in its construction and installation, in proportion to its strength, in which sheet metal stampings and other inexpensive elements are utilized to the exclusion of parts of more expensive nature, yet the design of which is such that sliding parts fit snugly and accurately, and unwanted side play and disalignment of opposite ends of the seat, and the danger of jamming of the seat by cocking it somewhat sidewise, which looseness of such parts frequently causes, are eliminated.

A further object is the provision of such a construction incorporating track and carriage members and interposed roller elements toothed to control the relative travel of the rollers and carriage, in which the toothed portions of the rollers may carry the weight of the carriage, and wherein axle pins for the rollers are provided which are arranged in novel fashion to also tie the track and carriage members against separation and disalignment.

Another object is the provision of such a slidable support for a seat arranged to change the angularity of the seat and its back during sliding travel thereof in adjustment, incorporating for this purpose track means curved about a horizontal axis.

Still another object is the provision of an adjustable support of the character indicated in which controlling rack means and toothed rollers are provided, the rack portions being formed integrally with the track and carriage portions of the supports, in a novel and very simple manner, and so offset from the body thereof as to be aligned with the roller elements, which are enclosed and positively held in alignment between the track and carriage members.

Other objects and advantages will be apparent from the following description, wherein reference is made to the accompanying drawings illustrating preferred embodiments of my invention and wherein similar reference numerals designate similar parts throughout the several views.

In the drawings:

Figure 1 is a side view of an automobile seat and appurtenant portions of the interior of a motor vehicle, the floor of which is shown in section, showing a typical application of my invention;

Figure 2 is an enlarged and fragmentary similar view showing my improved seat support in side elevation, the central portion being broken away;

Figures 3 and 4 are cross sectional views taken on lines 3—3 and 4—4 respectively of Figure 2, and looking in the direction of the arrows;

Figure 5 is a perspective view of a portion of one of the carriage members, bringing out the integral formation of the guide rack; and Figure 6 is a side elevational view similar to Figure 2 of a somewhat modified construction.

Referring now to the drawings, and particularly to Figures 1 to 5 inclusive, reference numeral 10 designates the floor of a vehicle body, and 12 the driver's seat, carried and adjustable toward and from the steering wheel 14 upon my improved supporting mechanism. The supports are of course intended to be used in pairs, one near each end of the seat, although but one unit is illustrated since they may be alike. Each comprises a track element 15 of angular form, having a base flange secured to the floor, as by carriage bolts 17, and an upstanding track flange 16. A cooperating carriage member 20 is arranged to travel upon the track, and is secured to the bottom of the seat frame 12. Each such carriage member is also of substantially right-angular form, including a downwardly extending flange 21 adapted to outlie the adjacent track flange 16, the spacing between the carriage members being for this purpose slightly greater than the spacing between the track flanges 16, to which they are parallel, although obviously either might outlie the other. The vertical flanges of the track and carriage members thus overlap and abut one another, as best shown in Figures 3 and 4, and are preferably so spaced as to be substantially in sliding engagement.

Selected portions of the flanges 16—21, (portions which overlap at least partly throughout the entire path of movement of the carriage with relation to the track) are relieved upon the inside, by pressing the same outwardly, as at 24, to space these portions from each other to any desired extent, and in such portions are formed longitudinal slot 25, which remain in alignment and at least partial registry throughout the entire travel of the carriage. The spacing between the relieved and slotted portions 24 is proportioned to accommodate a roller 28, which travels freely but is trapped therein and is journaled upon a pin 30 freely extended through and adapted to travel in the slots 25. Pin 30 is headed upon both sides to secure the channel members against separation. A leaf spring or spring washer as 32 may be secured beneath at least one of the heads, if desired, to provide a desired degree of friction and tolerance.

Integrally pressed from the body portions of both the track member and carriage member, in alignment with the space or gap between the portions 24 in which the roller is trapped, are toothed rack portions 33, that of the carriage member being pressed inward and downward, as best shown in Figure 3, and lying somewhat inside the general plane of flange 21, while the rack portion 34 formed upon the element is pressed outward somewhat beyond the general plane of flange 16 and turned upward in opposition to the rack portion 33. The roller is toothed to mesh with the racks and is thus made to occupy a predetermined position with relation to the carriage and track members as the former travels over the latter. It will be noted that those portions of the overlapping flanges 16—21 which are not so relieved snugly engage one another, and are held so both by their spacing and by the pins 30 upon which the rollers are journaled. The pins prevent separation of the flanges both vertically and laterally, and insure maintenance of alignment between the rollers and rack. If desired, also, the pins may share the vertical loads with the rollers.

In the shown construction two rollers are employed, one near each end of the assembly, but obviously more might be used. It will be understood that any suitable form of latching mechanism may be employed for releasably securing together the flanges 16—21 or otherwise holding the seat against sliding movement.

In the modified consruction shown in Figure 6 the track flange and carriage flange portion 16a—21a respectively are shown of increased height, and indicated as reinforced by integral ribs, as 18a. The track and carriage will also be seen to be elevated at the front to a position higher than the rear, and the line of travel as defined by the rack and slot portions is somewhat arched convexly, to tilt the seat farther backward as it is moved to the rear, and farther forward as it is moved closer to the steering wheel of the vehicle. For this purpose the rack portions 33a—34a and slots 25a are so arched (or those at the front may be arranged at an angle to and more nearly horizontal than those at the rear) that the back of the seat is raised with relation to the front as it is moved forwardly, and depressed with relation thereto as it is moved to the rear. This arrangement has been found of great convenience to the drivers of motor vehicles, inasmuch as shorter persons who desire to sit nearer the wheel also wish to sit erect when driving, whereas taller persons, who usually sit in a position further from the wheel, also ordinarily desire to recline or lean back further.

While it will be apparent that the illustrated embodiment of my invention herein disclosed is well calculated or adequately fulfill the objects and advantages primarily stated, it is to be understood that the invention is susceptible to variation, modification and change within the spirit and scope of the subjoined claims.

What I claim is:

1. In an adjustable support for a seat or the like, relatively movable track and carriage members having parallel overlapping flanges provided with registrable longitudinal slots, the portions of said flanges bounding the slots being relieved upon their abutting sides to provide a gap therebetween, other portions of the flanges being in slidable engagement with each other, said track and carriage elements also having substantially vertically aligned portions above and below said gap, a roller element arranged in said gap and engageable with said aligned portions to provide anti-friction bearing means between the carriage and track, and an axle spindle for said roller extending through said slots and over-engaging the outside surfaces of said flanges to prevent their separation both vertically and laterally.

2. In an adjustable support for a seat or the like, a track element, a carriage element movably carried thereby, said elements having generally vertical and parallel overlapping web portions provided with opposed registrable longitudinal slots, the areas of said web portions bounding the slots being relieved upon their abutting sides to define a gap between such web portions, other areas of said web portions being in substantial sliding engagement, said track and carriage elements having substantially vertically aligned portions above and below said gap, rack portions integrally formed upon said aligned portions and defining top and bottom edges of said gap, a toothed roller trapped and movable in said gap and meshing with said rack portions, and an axle pin for the roller extending through said opposed slots and overengaging the outer surfaces of said webs.

3. In an adjustable support for a seat or the like, a track element, a carriage element movably carried thereby, said elements having generally vertical and parallel overlapping web portions provided with opposed registrable longitudinal slots, the areas of said web portions bounding the slots being relieved upon their abutting sides to define a gap between such web portions, other areas of said portions being in substantial sliding engagement, toothed rack portions integrally pressed from said track and carriage elements and projecting toward each other in substantial alignment and defining top and bottom portions of said gap, a toothed roller trapped and movable in said gap and meshing with said rack portions, an axle pin extending through said roller and opposed slots and overengaging the outer surfaces of said web portions to prevent separation thereof both vertically and laterally and spring means between at least one of said overengaging portions and its web to allow limited yieldably-opposed separation of said webs to an extent less than the thickness of the roller.

4. Adjustable supporting means for the seats and the like, including a track member, a carriage member formed of sheet metal and movable over the track, anti-friction means between the carriage means and track member including toothed rollers, a guide rack integrally pressed from the carriage member and engaging said roller, the track member and carriage member comprising angular sheet metal elements having parallel overlapping flanges disposed substantially vertically, and each of said members carrying a guide rack formed integrally therewith and pressed therefrom in offset relation to the flange of the member by which it is carried and adapted to align with the rack of the other member, said toothed roller meshing with both racks.

5. Adjustable supporting means for the seats and the like, including a track member, a carriage member formed of sheet metal and movable over the track, anti-friction means between the carriage means and track member including toothed rollers, a guide rack integrally pressed from the carriage member and engaging said roller, the track member and carriage member comprising angular sheet metal elements having parallel overlapping flanges disposed substantially vertically, and each of said members carrying a guide rack formed integrally therewith and pressed therefrom in offset relation to the flange of the member by which it is carried and adapted to align with the rack of the other member, said toothed roller meshing with both racks and being trapped between the flanges.

6. Adjustable supporting means for the seats and the like, including a track member, a carriage member formed of sheet metal and movable over the track, anti-friction means between the carriage means and track member including toothed rollers, a guide rack integrally pressed from the carriage member and engaging said roller, the track member and carriage member comprising angular sheet metal elements having parallel overlapping flanges disposed substantially vertically, and each of said members carrying a guide rack formed integrally therewith and pressed therefrom in offset relation to the flange of the member by which it is carried and adapted to align with the rack of the other member, said toothed roller meshing with both racks and being trapper between the flanges, and means holding said flanges against separation but permitting relative sliding movement thereof.

7. Adjustable supporting means for the seats and the like, including a track member, a carriage member formed of sheet metal and movable over the track, anti-friction means between the carriage means and track member including toothed rollers, a guide rack integrally pressed from the carriage member and engaging said roller, the track member and carriage member comprising angular sheet metal elements having parallel overlapping flanges disposed substantially vertically, and each of said members carrying a guide rack formed integrally therewith and pressed therefrom in offset relation to the flange of the member by which it is carried and adapted to align with the rack of the other member, said toothed roller meshing with both racks and being trapped between the flanges, and means holding said flanges against separation but permitting relative sliding movement thereof comprising an axle pin for the roller extending through slots in and having portions overengaging the outer surfaces of said flanges.

8. Adjustable supporting means for the seats and the like, including a track member, a carriage member formed of sheet metal and movable over the track, anti-friction means between the carriage means and track member including toothed rollers, a guide rack integrally pressed from the carriage member and engaging said roller, the track member and carriage member comprising angular sheet metal elements having parallel overlapping flanges disposed substantially vertically, and each of said members carrying a guide rack formed integrally therewith and pressed therefrom substantially at the line of angular junction of its flanges is offset relation to said parallel flanges, one of said racks being arranged inside and the other outside the angle defined by the flanges of the member by which it is carried, the extent of the offset of each corresponding to substantially half the thickness of the roller, and the other portions of said parallel flanges being spaced from each other slightly more than the thickness of the roller and serving to maintain the roller in alignment with the racks.

THOMAS A. McGREGOR.